(12) United States Patent
Crisan

(10) Patent No.: US 7,014,099 B2
(45) Date of Patent: Mar. 21, 2006

(54) DATA ENTRY DEVICE

(75) Inventor: Adrian Crisan, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/039,048

(22) Filed: Dec. 31, 2001

(65) Prior Publication Data

US 2003/0121964 A1 Jul. 3, 2003

(51) Int. Cl.
*G06C 29/00* (2006.01)

(52) U.S. Cl. .................. 235/60 R; 235/430

(58) Field of Classification Search ........... 341/20–22, 341/34, 24, 168, 161; 379/368–370, 433.06, 379/433.07, 93.08, 93.2, 93.27; 235/60 R, 235/472.01, 472.02, 485, 462.45, 375, 376, 235/486, 462.4, 430, 470.02; 345/160, 168–169; 708/140, 142, 144, 145, 146; 463/37–38; 200/5 R, 43.18

See application file for complete search history.

(56) References Cited

U.S. PATENT DOCUMENTS

| | | | | |
|---|---|---|---|---|
| 4,381,502 A | * | 4/1983 | Prame | 341/26 |
| 5,496,992 A | * | 3/1996 | Madan et al. | 235/472.02 |
| 5,521,596 A | * | 5/1996 | Selker et al. | 341/22 |
| 5,539,193 A | * | 7/1996 | Gibbs et al. | 235/472.02 |
| 5,850,358 A | * | 12/1998 | Danielson et al. | 713/321 |
| 5,861,823 A | * | 1/1999 | Strauch et al. | 341/22 |
| 5,982,303 A | * | 11/1999 | Smith | 341/22 |
| 5,987,609 A | * | 11/1999 | Hasebe | 713/200 |
| 6,062,749 A | * | 5/2000 | Oikawa et al. | 400/110 |
| 6,069,848 A | * | 5/2000 | McDonald et al. | 368/107 |
| 6,127,949 A | * | 10/2000 | Dodd | 341/22 |
| 6,157,323 A | * | 12/2000 | Tso et al. | 341/22 |
| 6,173,194 B1 | * | 1/2001 | Vanttila | 455/566 |
| 6,232,892 B1 | * | 5/2001 | Burrell, IV | 341/22 |
| 6,320,942 B1 | * | 11/2001 | Chang | 379/93.27 |
| 6,377,685 B1 | * | 4/2002 | Krishnan | 379/433.07 |
| 6,441,753 B1 | * | 8/2002 | Montgomery | 341/34 |
| 6,520,699 B1 | * | 2/2003 | Abe | 400/485 |
| 6,559,778 B1 | * | 5/2003 | Hillmering | 341/23 |
| 6,563,923 B1 | * | 5/2003 | Otsuka | 379/368 |
| 6,597,345 B1 | * | 7/2003 | Hirshberg | 345/168 |
| 6,633,277 B1 | * | 10/2003 | Ivanov | 345/167 |
| 6,703,963 B1 | * | 3/2004 | Higginson | 341/176 |
| 6,727,916 B1 | * | 4/2004 | Ballard | 345/758 |
| 6,757,388 B1 | * | 6/2004 | Luo | 379/433.07 |
| 6,847,706 B1 | * | 1/2005 | Bozorgui-Nesbat | 379/93.27 |
| 2002/0119820 A1 | * | 8/2002 | Tsutsui | 463/37 |
| 2002/0130017 A1 | * | 9/2002 | Kalis et al. | 200/5 R |
| 2003/0090467 A1 | * | 5/2003 | Hohl et al. | 345/168 |

FOREIGN PATENT DOCUMENTS

JP 10200605 * 7/1998

* cited by examiner

*Primary Examiner*—Thien M. Le
*Assistant Examiner*—Edwyn Labaze

(57) ABSTRACT

A data entry device is provided. The data entry device includes a key having a first data entry value associated with depressing the key, and one or more additional discrete data entry values associated with deflecting the key in a predetermined direction, where a user-readable indication is provided for each discrete data entry value. The key is adapted for being depressed or deflected by a human fingertip.

17 Claims, 6 Drawing Sheets

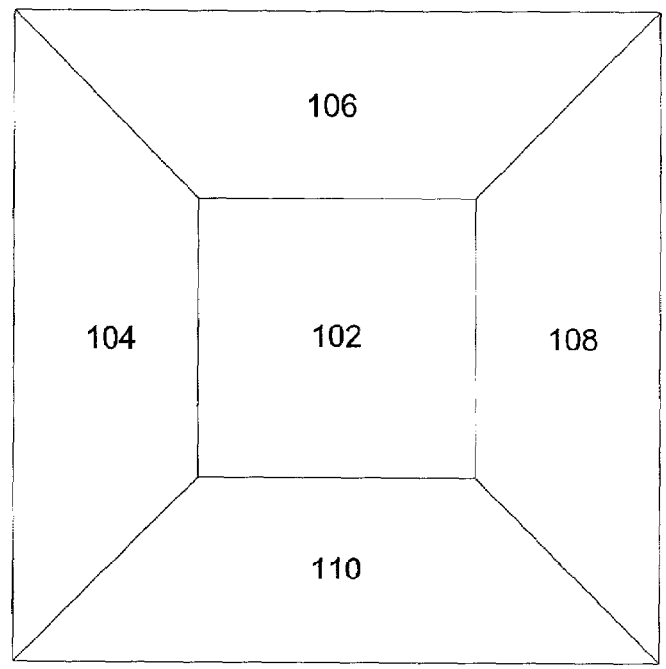
FIGURE 1    100
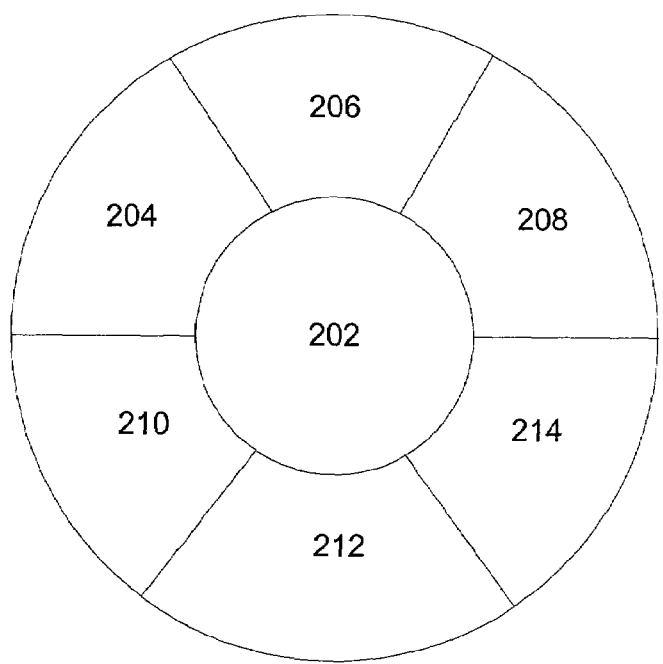
FIGURE 2    200

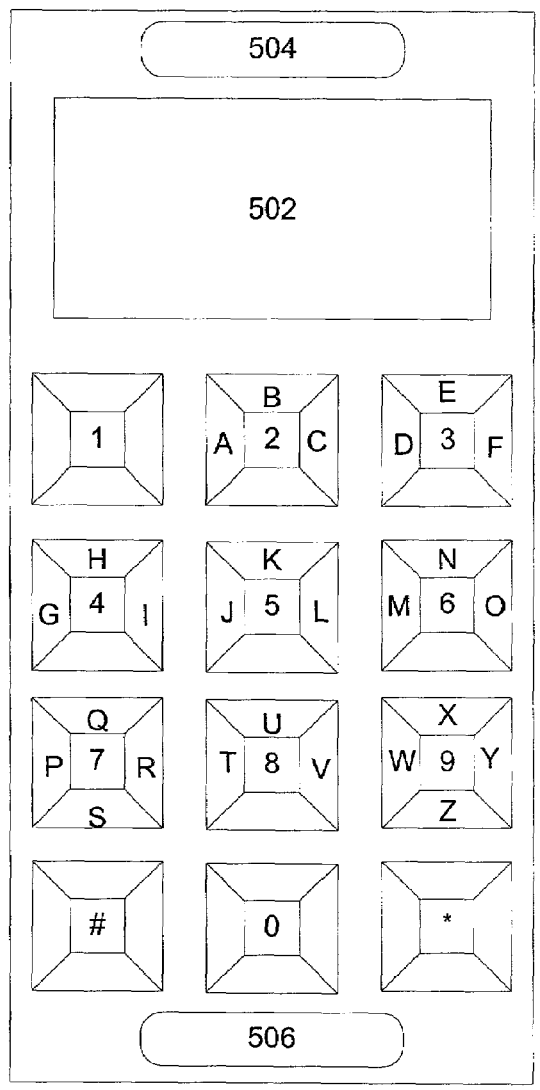
FIGURE 5      500
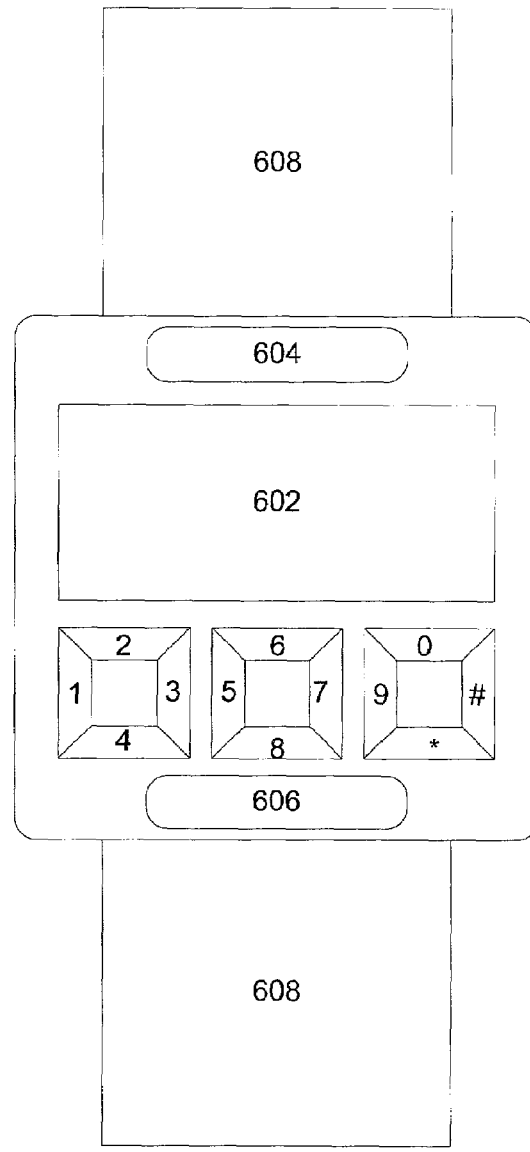
FIGURE 6      600

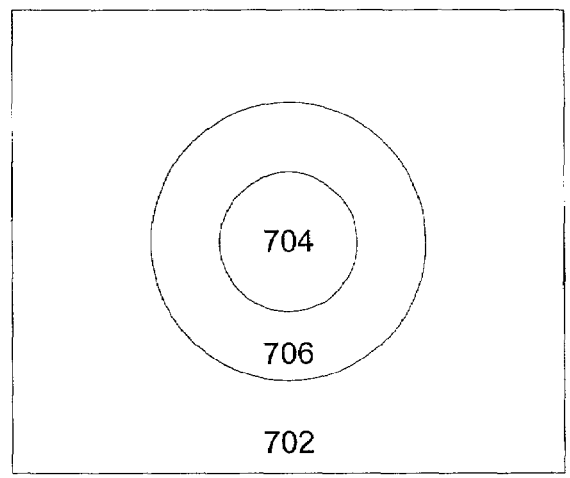
FIGURE 7    700
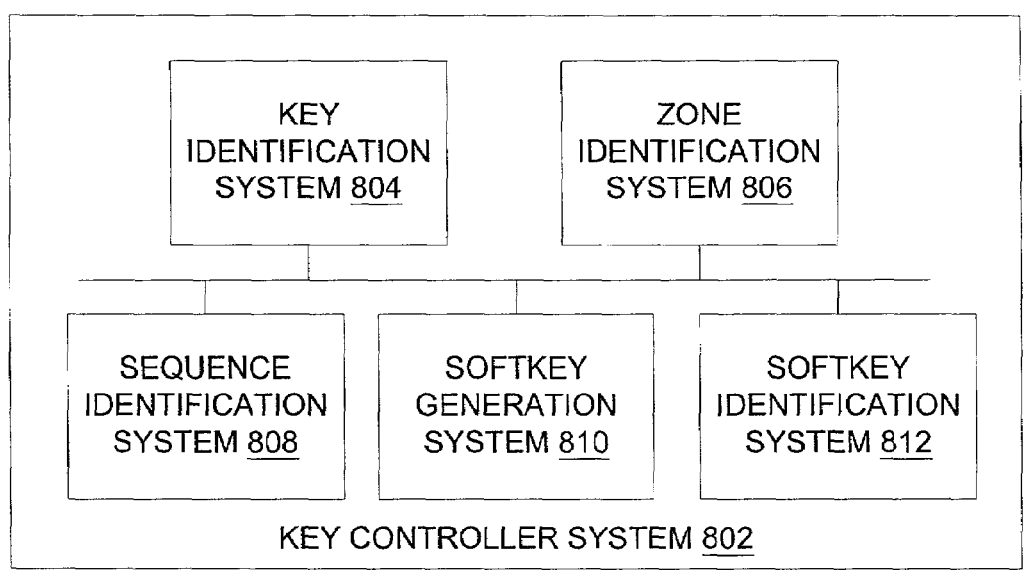
FIGURE 8    800

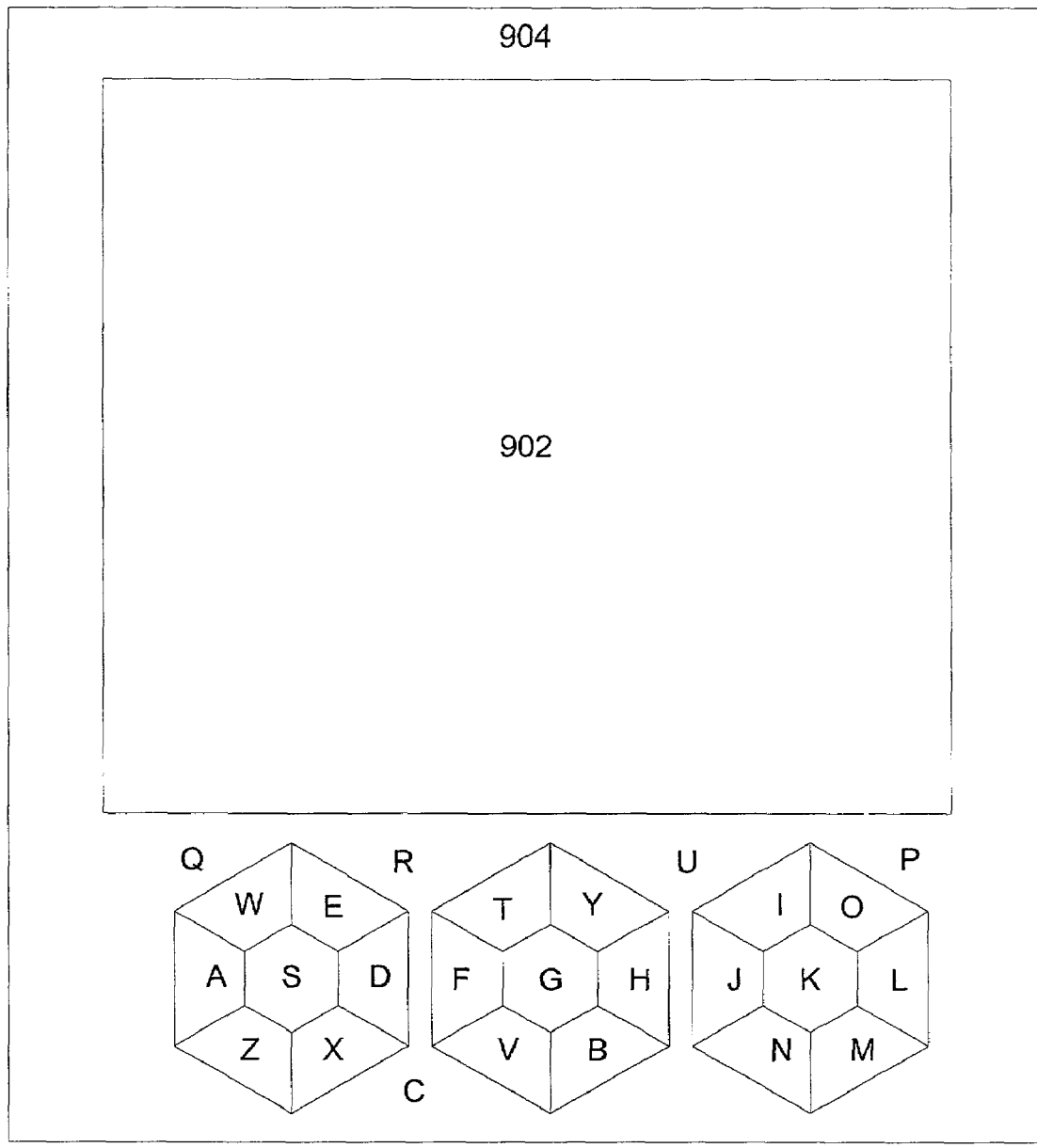

DATA ENTRY DEVICE

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention relates to data entry devices for digital signal processing, and more specifically to a key having two or more data entry modes to facilitate rapid entry of data.

2. Description of the Related Art

Data entry devices are known in the art. Such data entry devices include numeric keypads, alphanumeric keypads, mouses and joysticks. Each of these data entry devices has been optimized for a specific purpose. For example, a numeric keypad is often found on a telephone, whereas an alphanumeric keypad, a mouse, or a joystick is often found for use with a general or specific purpose processing platform, such as to allow a user to draft documents, select controls from a web page, or control a screen display, respectively.

While such data entry devices are useful, improvements in digital signal processing equipment have resulted in "crossover" functionality for such data entry devices. For example, it is common for a numeric keypad on a phone to be used to enter alphanumeric data. This is typically done by using a single key to select between three or four alphanumeric characters, such as by depressing the key between one and four times in succession, pressing a first numeric key to identify a sequence of three or four alphanumeric characters and then a second key to indicate a selection of one of the alphanumeric characters, or in other suitable manners. While such crossover functionality facilitates data entry in certain situations, the existing techniques are cumbersome to implement.

SUMMARY OF THE INVENTION

A data entry device according to the invention is provided that allows for two or more data entry selections from a single movement of a single key. The data entry device uses two or more toggle zones to allow a user to enter two or more data selections from a single key using a single keystroke. In the disclosed embodiment, the toggle zones can include a four zone arrangement, such as where the user can select a numeric value for a key by depressing the key, or can select an alphanumeric value by pushing the key towards the left, right, top, or bottom. In this manner, an existing telephone keypad with conventional alphanumeric values assigned to each number can be used to enter alphanumeric data with a single keystroke. For example, the number "2" key in a conventional telephone keypad can be associated with the letters "A," "B," and "C." In this exemplary embodiment, the present invention provides for at least three toggle zones selections, such that a user can enter the number "2" by depressing the key, can enter the letter "A" by pushing the key to the left, can enter the letter "B" by pushing the key up, and can enter the letter "C" by pushing the key to the right. Similar toggle functionality can be provided for other keys of a telephone numeric keypad, keys of other devices, or in other suitable manners.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which:

FIG. 1 is a diagram of a key having multiple data entry states in accordance with an exemplary embodiment of the present invention;

FIG. 2 is a diagram of a key for entering discrete data entry values in accordance with an exemplary embodiment of the present invention;

FIG. 5 is a diagram of a telephone in accordance with an exemplary embodiment of the present invention;

FIG. 6 is a diagram of a watch in accordance with an exemplary embodiment of the present invention;

FIG. 7 is a diagram of a soft key in accordance with an exemplary embodiment of the present invention;

FIG. 8 is a diagram of a system for using and controlling multi-function keys in accordance with an exemplary embodiment of the present invention;

DETAILED DESCRIPTION OF THE INVENTION

Figure 3:
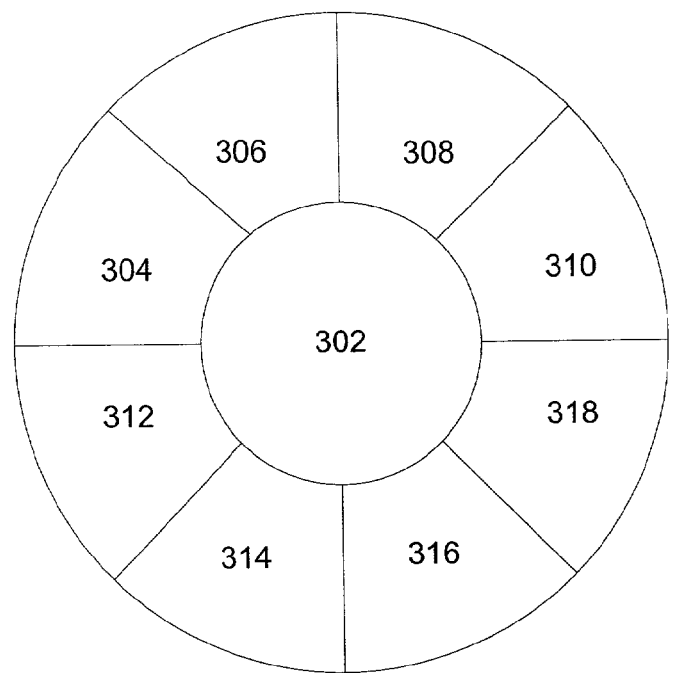
FIG. 3 is a diagram of a key having up to nine data entry states in accordance with an exemplary embodiment of the present invention.

FIG. 1 is a diagram of a key 100 having multiple data entry states in accordance with an exemplary embodiment of the present invention. Key 100 is configured for use by a human fingertip, such as by having mechanical size and shape characteristics that allow an operator to move the key so as to readily select one of two or more data entry states.

Key 100 includes data entry zones 102, 104, 106, 108 and 110. In one exemplary embodiment, key 100 can include beveled sides on data entry zones 104, 106, 108 and 110, and can have a flat top corresponding to data entry zone 102. In this manner, when a user places their fingertip on key 100, they will be able to determine by touch the portions of key 100 corresponding to each data zone. Key 100 is further operable to be depressed or actuated in a suitable manner, such that data entry zone 102 can be activated by depressing key 100, data entry zone 104 can be activated by pushing key 100 in the direction of data entry zone 104, data entry 106 can be actuated by pushing key 100 in the direction of zone 106, data entry zone 108 can be activated by pushing key 100 in the direction of data entry zone 108, and data entry zone 110 can be activated by pushing key 100 in the direction of data entry zone 110. In this manner, a user can select from one of five discrete data entry states for key 100 using a single keystroke.

Key 100 can be configured using suitable actuators. In one exemplary embodiment, a push button switch can be placed under each data entry zone, and mechanical supports and restraints can be placed under key 100 so that it can toggle in the direction of data entry zones 104, 106, 108 and 110, in addition to allowing key 100 to be depressed downward for actuation of data entry zone 102. In another exemplary embodiment, key 100 can have a push button type switch for actuation of data entries for data entry zone 102, and slider switches in each direction of data entry zones 104, 106, 108, 110, such that a user can indicate data entry for data entry zone 104 by sliding switch 100 to the left, entry of data entry zone 106 by sliding switch 100 upward, entry of data entry zone 108 by sliding switch 100 to the right, and entry of data entry zone 110 by sliding switch 100 downward. In this manner, switch 100 allows a user to enter one of five data values by using a single keystroke, such as a depressing keystroke, an upwards or downwards keystroke, a left or right keystroke, or other suitable keystrokes.

In another exemplary embodiment, key 100 can be used to enter additional data based on a sequence of keystroke entries. In this exemplary embodiment, a combination of moving key 100 in the direction of zone 104 and zone 108 can be used to enter data associated with a sixth data value, and additional combinations of selection of zones 102, 104, 106, 108, and 110 can be used to enter additional data values. For example, where data entry zones 104, 106, 108, and 110 are associated with alphabetic data, actuating key 100 in the direction of one of these data zones without depressing data zone 102 may indicate an upper case alphabetic data value, whereas actuation of key 100 in the area of one of these data zones after actuation of zone 102 can indicate a lower case alphabetic data value. Other suitable conventions that utilize a sequence of keystrokes can likewise be used.

In yet another exemplary embodiment, the data entry zones of the keys can be implemented as LCD panels or other suitable displays that can display of the result when the key is moved into the data entry zone. In this exemplary embodiment, the letter that will be entered when a corresponding data entry zone is selected can be displayed on the screen for that zone. Furthermore, one of the keys can be assigned functions, such as "shift," "all caps," "number lock," "alt," and "ctrl," such that when a function key is actuated, the corresponding keys on the keypad would be modified. For example, if the "all caps" function is selected, the display for each data entry zone can indicate a capital letter. Likewise, a single indicator on a display can be used to indicate that the "all caps" control has been activated, or other suitable procedures can be implemented. In another exemplary embodiment, if a menu is displayed on the screen, the key panels can be used to display arrow keys to allow menu navigation.

In operation, key 100 allows an operator to perform data entry for one of two or more states using a single keystroke of a single key. While a normal key has two states, i.e., on and off, key 100 adds additional data entry states to expand the data entry capabilities of a single key actuated by a single user action. In this manner, the conventional procedures for entering multiple data values using a single key, such as those requiring multiple keystrokes for each data value, can be avoided.

FIG. 2 is a diagram of a key 200 for entering one of multiple discrete data entry values using a single keystroke in accordance with an exemplary embodiment of the present invention. Key 200 allows one of up to seven discrete data entry values to be entered using a single key actuation.

Key 200 includes data entry zones 202, 204, 206, 208, 210, 212, and 214, each of which can be associated with entry of a predetermined or user assignable discrete data value. Unlike a joystick, a TrackPoint™ pointing device available from IBM, or other multi-directional type joystick pointing devices, key 200 has discrete data values associated with movement in each direction. In this manner, a user is able to select between one of the six available peripheral data values by moving key 200 in a direction towards each predetermined zone. Likewise, the user can select data zone 202 by depressing key 200. Key 200 can also be used to allow sequential entry of data, such as by pressing key 200 downwards to actuate zone 202, and then by moving key 200 in a direction of one of the peripheral data zones. Suitable actuators, such as those used with key 100, can also be used in connection with key 200, such as a mechanical toggle arrangement with switches around the periphery of key 200, where one switch is associated with each of peripheral data entry zones 204 through 214, a push button type actuator associated with zone 202 with slide actuators for actuation of data entry zones 204 through 214, or other suitable configurations.

In one exemplary embodiment, key 200 can be used in conjunction with other keys to provide alphabetic or alphanumeric data entry. In this exemplary embodiment, three or more keys 200 can be used to simulate a QWERTY Keyboard, such as by associating data zone 202 with an alphabetic key of a QWERTY keyboard, such as "S", and by assigning keys to data zones 204 through 214 that would normally occur around the periphery of the alphabetic key, such as "A," "W," "E," "D," "X," and "Z." In this manner, a QWERTY keyboard can be simulated with as few as three keys. This arrangement will provide for actuation of twenty one letters, which leaves five letters left over for actuation by a two phase keystroke (such as depressing key 200 to actuate data zone 202 and then sliding key 200 in the direction of one of the remaining five letters). Likewise, other suitable procedures or configurations can be used for entry of such remaining letters.

In operation, key 200 allows a user to select from one of up to seven data entry states using a single actuation of key 200. In this manner, key 200 facilitates the entry of data, and avoids the need for multiple actuations of a key in order to allow the key to be used to enter more than one data state.

FIG. 3 is a diagram of a key 300 having up to nine data entry states, in particular, data entry states 302, 304, 306, 308, 310, 312, 314, 316, and 318. Unlike keys 100 and 200, key 300 has a number of data entry states that may border on being problematic for the average user. For example, the difference between selection of state 304 and 306 may be such that the average user inadvertently selects an undesired state with an unacceptable frequency. Thus, it may be desirable to allow a user to select between a configuration of key 300 and key 200. For such user selectable combinations, a mechanical sliding switch arrangement or other mechanical switches that constrain key 300 or key 200 to predetermined data selection zones might not be desirable. In this exemplary embodiment, a joystick or other type selection device can be used that allows selection from a large number of discrete points, thus providing essentially continuous selectivity, where a range of such discrete point values is assigned to each data zone. Thus, a user could configure the key to have a desired number of data entry zones, including an odd numbers of data entry zones, or a number of data entry zones not explicitly shown herein. A peripheral display can also be utilized to allow users to select the desired discrete number of entry zones and have the selected zones displayed, such as an LED or LCD display.

Figure 4:
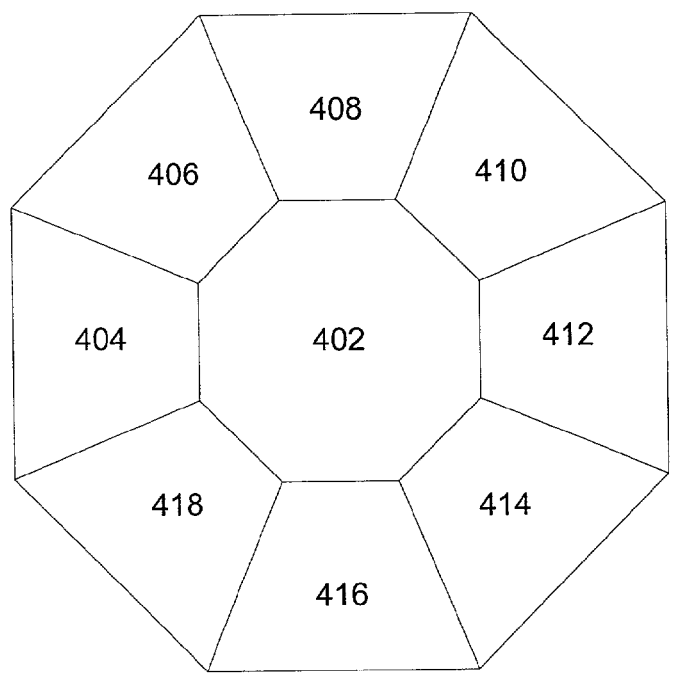
FIG. 4 is a diagram of a key in accordance with another exemplary embodiment of the present invention.

FIG. 4 is a diagram of a key 400 in accordance with another exemplary embodiment of the present invention. Key 400 also allows the user to select from up to nine data zone entries with a single actuator action, but includes beveled faces to allow the user to more readily detect a desired data entry zone. Key 400 can thus be used when the number of data entry zones is fixed to increase the ease of data entry zone recognition by the user, and to decrease the incidence of incorrect data entry.

FIG. 5 is a diagram of a telephone 500 in accordance with an exemplary embodiment of the present invention. Telephone 500 includes display 502, speaker 504, and microphone 506, which can be conventional cellular telephone devices, wireless telephone devices, wire line telephone devices, or other suitable telephone devices. In addition, telephone 500 includes twelve alphanumeric data entry keys. The arrangement of these keys is such that directly depressing each key results in entry of the standard telephonic numeric values, as shown. Likewise, each key can also be configured in the manner of key 100, such that movement of the key in the direction of the alphabetic character shown can result in the entry of such alphabetic character. Thus, if a user wishes to enter a text message into telephone 500, the individual letters for the text message can be entered by a single key actuation, as opposed to conventional alphabetic data entry procedures for telephones having twelve-key keypads that require the user to perform two or more key actuations for each alphabetic character.

FIG. 6 is a diagram of a watch 600 in accordance with an exemplary embodiment of the present invention. Watch 600 includes display 602, speaker 604, microphone 606, and watchband 608, in addition to three multiple data entry value keys such as key 100. Watch 600 thus allows a user to dial telephone numbers using three keys, to perform calculations using three keys, or to perform other suitable numeric functions. In this manner, watch 600 can be used to provide cell phone functionality, calculator functionality, or other suitable functionality using only three keys. Other configurations of keys, such as key 200 or key 300, can also be used so as to provide such numeric data entry capabilities using only two keys, a single key, or other suitable configurations of keys.

FIG. 7 is a diagram of a key 700 in accordance with an exemplary embodiment of the present invention. Key 700 includes soft key definition display 702, data entry zone 704, and data entry zone 706. Soft key definition display 702 can be a suitable display, such as an LCD display, an LED display, or other suitable displays that are used to generate soft key definitions for actuation using data entry zone 704 and data entry zone 706. In this exemplary embodiment, data entry zone 706 can have predetermined data entry actuation zones, can use a joystick or other suitable "continuous" data entry device where regions are allocated for data entry zones, or other suitable procedures can be used to associate data entry with soft key definitions. Key 700 thus allows the data entry selections to be modified as required, such as to allow users to configure key 700 for a user selectable configuration, to allow key 700 to provide rapid data entry, or for other suitable purposes.

FIG. 8 is a diagram of a system 800 for using and controlling multi-function keys in accordance with an exemplary embodiment of the present invention. System 800 includes key controller system 802 and key identification system 804, zone identification system 806, sequence identification system 808, soft key generation system 810, and soft key identification system 812, each of which can be implemented in hardware, software, or a suitable combination of hardware and software, and which can be one or more software systems operating on a general purpose processor platform, a digital signal processor platform, or other suitable processors. As used herein, a software system can include one or more objects, agents, lines of code, threads, subroutines, databases, application programming interfaces (APIs), or other suitable data structures, source code (human readable), object code (machine readable), and can include two or more different lines of code or suitable data structures operating in two or more separate software applications, on two or more different processing platforms, or in other suitable architectures. In one exemplary embodiment, a software system can include one or more lines of code or other suitable software structures operating in a general purpose software application, such as an operating system, and one or more lines of code or other suitable software structures operating in a specific purpose software application. In another exemplary embodiment, a software system can be implemented as a distributed software system, on a different processing platform than that shown in the exemplary embodiments herein, or in other suitable manners. In yet another exemplary embodiment, system 800 can be implemented using an application specific integrated circuit, a field programmable gate array, or in other suitable manners.

Key controller system 802 is coupled to and receives data from keys such as key 100, key 200, key 300, or other suitable keys that provide more than one data state, and converts such key entries into data values. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system of a general purpose computing platform.

In one exemplary embodiment, key controller system 802 can determine from a standard telephone keypad whether an alphabetic or numeric data value is being entered, and the appropriate alphabetic or numeric data value. For example, key controller system 802 can include a number of gates associated with each of twelve keys, such that the key being actuated can be determined by the gate receiving the signal. Likewise, key controller system 802 can receive data signals generated when a key is actuated in a certain manner, such as by being depressed, moved to one side, or in other suitable manners, and can convert the data signal into a corresponding data value. For example, in a twelve key numeric telephone keypad, each key can generate a three digit binary number, the value of which depends on whether the key has been depressed or pushed to a side. Likewise, hexadecimal data values or other suitable signals can be generated by each key depending upon the zone that has been actuated. Key controller system 802 can convert such signals into the data value associated with each data entry zone based the signal received, the data value received, or other suitable data.

Key identification system 804 identifies one or more keys based on the physical arrangement of the key, data generated by the key, or other suitable data. In one exemplary embodiment, key identification system 804 can include an array of gates, where each gate is physically connected to a key. Likewise, key identification system 804 can determine the identity of a key based on a code associated with that key, such as where each key generates a code specific to that key for each of the data zones associated with that key. Different language characters sets can also be associated with each code, such as to allow the system to be used in different countries or for other suitable purposes. UNICODE can also or alternatively be used.

Zone identification system 806 identifies one or more zones of a key that has been actuated, such as by determining from a physical connection to a switch associated with each zone that the zone has been actuated, by translating a data value associated with each zone, or by using other suitable zone identification processes. In one exemplary embodiment, each data entry zone of a key can have a hexadecimal value associated with it, where the hexadecimal value for each data entry zone is selected to be different from that for every other zone. In this manner, zone identification system 806 can map the hexadecimal value for each zone to a corresponding alphabetic data value, numeric data value, or other similar data values.

Sequence identification system 808 receives key sequence data and determines whether the key sequence data is indicative of additional data fields. In one exemplary embodiment, sequence identification system 808 can be configured to receive and store data if key entries are received within a predetermined time, such that additional data entry values can be created by selection of two keys simultaneously, by depressing a key and then moving it in a predetermined direction, or in other suitable manners.

Soft key generation system 810 generates soft key identification data to enable a user to identify data entry zones of a soft key. In this exemplary embodiment, soft key generation system 810 can allow a user to define data entry zones, to configure data entry zones for that user, and can provide other suitable functionality.

Soft key identification system 812 receives data from a key and determines the corresponding soft key associated with the data entry zone. In one exemplary embodiment, soft key identification system 812 can be mapped to a peripheral data generation device, such as a joystick or TrackPoint™ pointing device, and can correlate the movement of a key to a soft key label that has been generated. In this manner, soft key identification system 812 maps physical data received from a device with the soft key that is currently being generated, so as to allow keys to be used for multiple functions.

In operation, system 800 allows keys with two or more data entry states to be used for data entry. System 800 converts the data signals received from such keys into data values associated with user-readable indications, so as to allow a user to readily enter one of two or more data values using a single key actuation. System 800 also allows a user, a system, or other suitable sources to configure soft keys, and allows users to actuate such soft keys so as to enter one of two or more data values using a single keystroke.

Figure 9:
FIG. 9 is a diagram of a palm computing device in accordance with an exemplary embodiment of the present invention.

FIG. 9 is a diagram of a palm computing device 900 in accordance with an exemplary embodiment of the present invention. Palm computing device 900 includes screen 902 and assembly 904, which can be conventional palm computing assemblies and screens for use with low power or high power palm computing devices. In addition, palm computing device 900 includes three multifunction keys having alphabetic data entry zones arranged in the configuration of a QWERTY keyboard. As shown in FIG. 9, palm computing device 900 uses the conventional QWERTY configuration to allow a user who is familiar with the QWERTY keyboard to readily enter data into palm computing device 900 using only three keys.

Because the three keys only provide 21 data entry zones, other suitable procedures can be used to allow the user to enter one of the excluded alphabetic data values ("Q," "R," "U," "P," and "C" in this exemplary embodiment). The user can select one of these excluded alphabetic data values by first pressing down on a key, and then sliding the key in the direction of the desired data value (e.g., by pressing down "S" and sliding the key in the direction of "W" to select "Q"). Likewise, pressing the data entry zone adjacent to the excluded alphabetic data value twice, selecting two data entry zones in sequence, or other suitable procedures can be used. An additional data entry key or keys can also or alternatively be provided.

Figure 10:
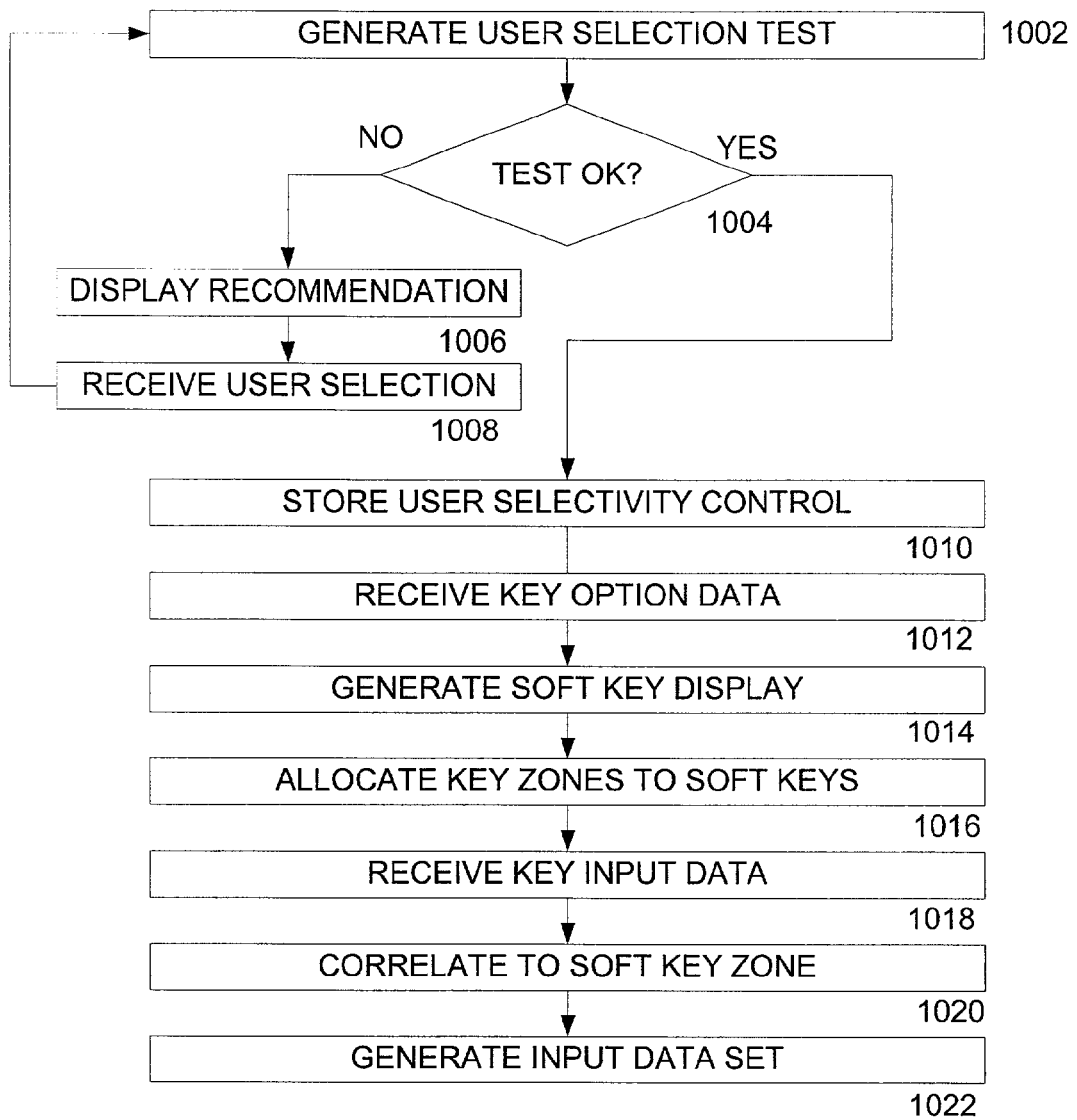
FIG. 10 is a flow chart of a method for implementing multifunction soft keys in accordance with an exemplary embodiment of the present invention.

FIG. 10 is a flow chart of a method 1000 for using multifunction soft keys in accordance with an exemplary embodiment of the present invention. Method 1000 begins at 1002 where a user selection test is generated. In one exemplary embodiment, a user can be prompted to use an existing configuration of a button or key, such as by prompting the user to enter a first data zone value, a second data zone value, and continuing until all data zones have been selected at least once. The method then proceeds to 1004.

At 1004, it is determined whether the test indicates that the results are acceptable. If it is determined at 1004 that the test results are not acceptable the method proceeds to 1006 where recommendation data is displayed. In one exemplary embodiment, if the results of the user selection test indicate that the user will have problems selecting between data entry zones, the recommendation can include a suggestion to repeat the test. Likewise, the recommendation can include using soft key definitions that have less data zones, more data zones, or other suitable recommendations. The method then proceeds to 1008, where a user selection is received, such as a selection of number of data zones to be displayed with a soft key. The method then returns to 1002.

If it is determined at 1004 that the test results are acceptable, the method proceeds to 1010 where the user is notified that the test results are acceptable and the user's selectivity control selection is stored. The user can also be provided with the option of trying a different configuration, in which case the method would return to 1002. Furthermore, in another exemplary embodiment, steps 1002 through 1010 can be omitted, such as where user selection of data entry zones is not provided. The method then proceeds to 1012.

At 1012, key option data is received. In one exemplary embodiment, the key option data can include one or more data values for predetermined data zones, data zone definition data for defining the number of data entry zones, or other suitable key option data. The method then proceeds to 1014 where a soft key display is generated having data entry zone definitions based on the key option data received at 1012. The method then proceeds to 1016.

At 1016, soft key data entry zones are allocated to the soft key display. In one exemplary embodiment, if a key has a predetermined number of fixed discrete data entry zone devices, such as binary switches or slide switches, then each discrete data entry zone device is allocated to a soft key. Likewise, where a "continuous" actuation mechanism is used, such as a joystick, the zones for such continuous actuation mechanisms can be assigned to soft keys. The method then proceeds to 1018.

At 1018, soft key input data is received. The soft key input data can include the actuation of a switch, selection of a "continuous" actuator along a discrete interval, or other suitable input data. The method then proceeds to 1020, where the soft key input data is correlated to a soft key data entry zone. For example, where a four zone soft key is used with a "continuous" actuation mechanism, a degree of arc from zero to 90 degrees can be associated with a first soft key data entry zone, a degree of arc from 90 to 180 degrees can be associated with a second soft key data entry zone, a degree of arc from 180 to 270 degrees can be associated with a third soft key data entry zone, and a degree of arc from 270 back to zero degrees can be associated with a fourth soft key data entry zone. Other suitable allocations can also be used, such as where the degrees of arc for each zone are not equivalent. The method then proceeds to 1022.

At 1022 an input data set is generated. For example, a soft key can provide a user with choices to select between software applications, such as a phone book application, a calculator application, or other suitable applications. After the user selects a soft key zone, the command to cause such applications to activate can be generated. Likewise, selections from calling lists, program functions, or other suitable commands can be mapped to soft key data entry zones, such that the input data set generated at 1022 can allow a single user command to replace entry of such command data or other suitable data.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A data entry device comprising:
   a key having a first data entry value associated with depressing a first portion of the key;
   the key having a second data entry value associated with deflecting the key in a predetermined direction toward a second portion of the key different from the first portion;
   the key having a third data entry value associated with simultaneously depressing and deflecting the key in the predetermined direction to engage both the first and second portions of the key;
   the key having a user readable indication of the first, second, and third data entry values; and
   where the key is adapted for being displaced by a human fingertip.

2. The data entry device of claim 1, wherein the first data entry value is a numeric data value, and the second and third data entry values comprise alphabetic data values.

3. The data entry device of claim 1, wherein the second and third data entry values are each associated with a predetermined zone around a periphery of the key.

4. The data entry device of claim 3 wherein the number of predetermined zones is user selectable.

5. The data entry device of claim 1, wherein the second and third data entry values are each associated with an adjustable zone around a periphery of the key.

6. The data entry device of claim 1 further comprising a controllable display around the periphery of the key.

7. The data entry device of claim 6 wherein the controllable display is an LCD.

8. The data entry device of claim 1 wherein the key is square in shape and the number of predetermined directions are four.

9. The data entry device of claim 1 wherein the key is circular in shape and the number of predetermined directions are four, six, or eight.

10. The data entry device of claim 1 wherein the key is hexagonal in shape and the number of predetermined directions are six.

11. The data entry device of claim 1 wherein the key is octagonal in shape and the number of predetermined directions are eight.

12. A data entry device comprising:
    a plurality of keys, each key having a first data entry value associated with depressing the key to displace a first portion of the key;
    each key having one or more additional discrete data entry values associated with deflecting the key in a predetermined direction to displace the key toward a second portion of the key different from the first portion;
    each key having a user readable indication of the first data entry value and each of the one or more additional discrete data entry values; and
    a plurality of the user readable indications having alphabetic characters arranged in positions relating to a QWERTY keyboard.

13. The data entry device of claim 12 wherein the plurality of keys comprise a 12-key telephone numeric keypad.

14. The data entry device of claim 12 wherein the plurality of keys is a three-key watch keypad.

15. The data entry device of claim 12 wherein the plurality of keys is a three-key handheld computer keypad.

16. A method of data entry, comprising:
    referencing a first alphanumeric character in response to displacement of a first portion of a key;
    referencing a second alphanumeric character in response to displacement of a second portion of the key; and
    referencing a third alphanumeric character in response to cooperatively depressing the first portion and deflecting the second portion.

17. The method of claim 16, wherein the key is positioned in relation to a user viewable designation of the first, second, and third alphanumeric characters to represent a portion of a QWERTY keyboard.

* * * * *